United States Patent

Farmery

[15] 3,667,497
[45] June 6, 1972

[54] HYDRAULIC SYSTEMS
[72] Inventor: George K. Farmery, Scothern, England
[73] Assignee: Clayton Dewandre Company Limited, Lincoln, England
[22] Filed: May 11, 1970
[21] Appl. No.: 36,002

[52] U.S. Cl. .............................137/118, 251/30, 340/52 C, 340/59
[51] Int. Cl. ....................................G05d 11/00, B60q 1/00
[58] Field of Search..............340/52 C, 58; 251/30; 184/6.1, 184/6.4; 137/118

[56] References Cited

UNITED STATES PATENTS 3,194,608  7/1965  Rich......................................340/52 C
3,196,389  7/1965  Heidner................................340/59 X
2,893,680  7/1959  Freund....................................251/30

Primary Examiner—Samuel B. Rothberg
Assistant Examiner—David J. Zobkiw
Attorney—Norris & Bateman

[57] ABSTRACT

A hydrodynamic type hydraulic system for actuating the brakes and other auxiliary devices on a motor vehicle includes a solenoid-operated valve for controlling the flow of pressure fluid to the auxiliary devices, said valve being controlled by means responsive to the pressure at the output side of the pump and additionally by means responsive to fluid level in the system reservoir.

5 Claims, 2 Drawing Figures

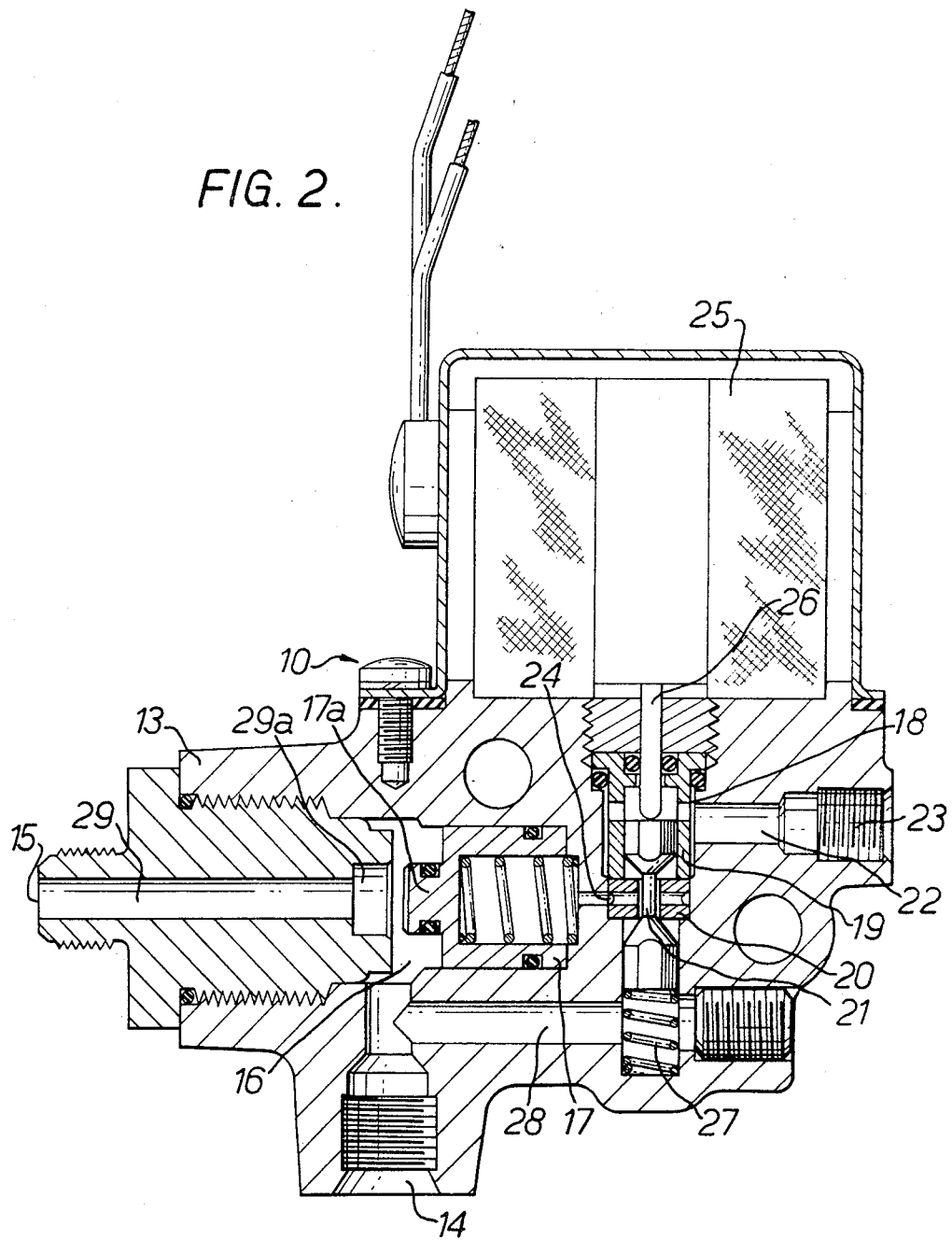

HYDRAULIC SYSTEMS

This invention relates to hydraulic systems of the hydrodynamic type, that is, systems embodying a pump and a constantly circulating system with one or more hydraulic accumulators and a control valve for directing pressure fluid to a device or devices to be actuated.

Where such a system is used on a motor vehicle to actuate the brakes it is convenient and economically desirable to use the same system for operating hydraulically actuated auxiliary or ancillary devices, but in the event of a failure in the system, for example a leak or a pump failure, it is necessary to ensure that the remaining availability of the system is reserved for braking only. It is considered inadequate, however, to rely solely upon pressure loss for the actuation of a safety device as such method of control leaves only a limited available braking capacity, and it is the object of the present invention to increase the safety factor in hydraulic systems of this kind with a view to ensuring adequate residual braking capacity in the event of a failure as above mentioned.

According to the invention the supply of pressure fluid to the auxiliary devices is placed under control of means responsive to the prevailing pressure at the output side of the pump and to means responsive to fluid level in the system reservoir.

One embodiment of the invention will now be described by way of example and with reference to the accompanying drawings wherein:

FIG. 2 is a sectional view of a solenoid-operated shut-off valve used in the system of FIG. 1.

Figure 1:
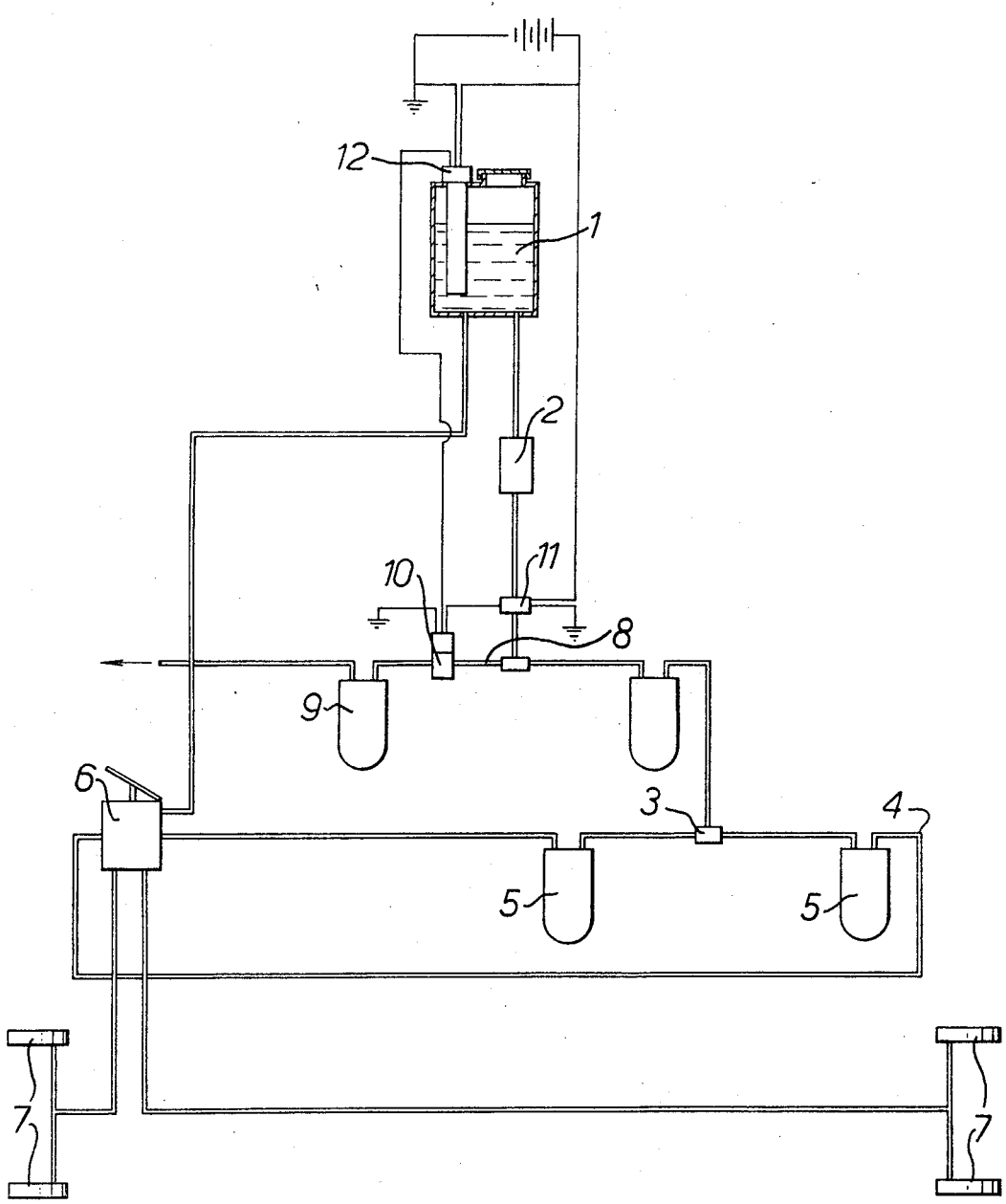
FIG. 1 is a schematic view of the improved braking system.

Referring first to FIG. 1, the system comprises a fluid reservoir 1, a pump 2 receiving fluid from the reservoir and discharging it under pressure past a built-in delivery valve (not shown) also acting as a non-return valve to a further non-return valve 3 and then to a closed circuit 4 embodying one or more hydraulic accumulators 5, and a brake valve 6 for diverting pressure fluid as required to the brake motors 7. The output from the pump is also led by way of a branch line 8 and past a further accumulator 9 to the auxiliary devices with their associated control means.

For the purpose of the invention a solenoid-operated valve 10 is interposed in the fluid line to the auxiliary devices, said valve being controlled by a circuit incorporating a low pressure warning switch 11, that is, a device responsive to the pressure at the output side of the pump and operable to close the circuit upon a predetermined fall in the pump output pressure, and a float-operated or similar switch 12 responsive to fluid level in the reservoir 1, the two switches being connected in parallel into the solenoid circuit. Thus either a predetermined fall in fluid level in the reservoir or a loss of output pressure from the pump will result in the auxiliary devices being disconnected from the system, the remaining pressure fluid in the system being available wholly for braking.

The valve 10 is shown in detail in FIG. 2 and comprises a housing 13 formed at one side with an inlet port 14, to which is connected the output from the pump 2, and at another side with a discharge port 15 via which pressure fluid is delivered to the auxiliary devices, both ports communicating with a valve chamber 16 within which is disposed a spring-loaded piston type main valve element 17. The housing is also counterbored at 18 to receive a pilot valve assembly, said assembly comprising a tubular valve guide 19, an apertured seating member 20 and a dumbbell shaped valve component 21, conveniently formed in two parts for assembly, and extending through the aperture in the seating member. The counterbore 18 communicates by way of a passage 22 with a spill port 23 connected to the reservoir, while the bore or aperture in the seating 20 is connected by radial passages with an annular groove 24 in permanent communication with the inner end of valve chamber 16. Mounted on the housing in axial alignment with the pilot valve assembly is a solenoid 25 the armature of which carries a plunger 26 extending into said assembly and into abutment with the valve component 21, and being operable to displace said valve element against the action of a loading spring 27. The valve operates in the following manner:

Under normal running conditions with adequate line pressure and a satisfactory liquid level in the reservoir, the valve 10 is in the condition shown, ports 14 and 15 being interconnected via chamber 16 so that all auxiliary devices are operative. Should a low pressure be sensed at switch 11 or a low fluid level at switch 12, the solenoid 25 is energized and plunger 26 actuated to force downwards the valve component 21 thereby establishing connection between the rear side of the main valve 17 and the inlet port 14 by way of the radial passages and the bore of the seating 20, the lower end of the counterbore 18 and a further passage 28 in the housing. Thus pressures are equalized at opposite sides of the main valve 17 and the valve moves under the action of its loading spring to close off the passage 29 to the discharge port 15. Preferably, the valve element 17 has a central boss 17a which in this operative position has a sealed sliding fit within an enlargement 29a of the passage 29 so ensuring a fluidtight closure of the port.

When critical conditions in the system have been rectified, the solenoid will become de-energized and spring 27 will lift the pilot valve element, cutting off the pressure fluid supply to the rear side of valve 17. This pressure will however continue to act on the front side annulas of the valve 17 so moving it back against its loading spring, trapped fluid behind the valve being discharged through the spill port 23.

It is to be noted that the improved form of control not only increases the safety factor but it also has the advantage of reducing accumulator charging times up to low pressure warning switch setting, since the auxiliary accumulators are isolated until this predetermined pressure is reached.

I claim:

1. In a hydraulic system for a motor vehicle, a reservoir containing hydraulic fluid, means connecting said reservoir to a pump having an output providing hydraulic fluid under pressure, means defining a hydraulic brake circuit connected to the pump output and containing at least one brake motor and a valve for selectively applying fluid pressure from the pump to said motor, means defining a hydraulic auxiliary device circuit connected to the pump output and control means operatively connected to be automatically responsive to either a predetermined drop in hydraulic fluid pressure at the pump output or to a predetermined fall in the hydraulic fluid level in said reservoir, or both, for disabling said auxiliary device circuit while maintaining available pump output pressure at said brake circuit.

2. In the hydraulic system defined in claim 1, said auxiliary device circuit comprising a branch passage connected to a passage connecting the pump output to said brake circuit, and said control means comprising a normally open valve in said branch passage operably connected to pressure responsive means disposed between the pump and the brake motor and to liquid level responsive means at the reservoir.

3. A hydraulic system as claimed in claim 2, wherein said normally open valve in the branch passage is a solenoid-operated valve that includes a main valve element controlling fluid flow between an inlet port connected to the pump output and a delivery port connected to the auxiliary device circuit, said valve element being subjected at one side to inlet port pressure normally urging said valve element in a direction to permit fluid communication between said inlet and delivery ports, spring means acting on the other side of said valve element loading the valve element to bias it in the opposite direction, and a pilot valve operable upon energization of the solenoid of said solenoid - operated valve to admit inlet port pressure to the other side of said valve element whereby fluid pressures at both sides of the valve element are balanced and the valve element moves under its spring loading to close off the delivery port.

4. In the hydraulic system defined in claim 1, said control means comprising a pressure sensitive switch connected to be responsive to pump outlet pressure and a level responsive switch at the reservoir, and there being a normally open solenoid valve in said auxiliary device circuit having an electrical energizing circuit wherein said switches are connected in parallel.

5. In the hydraulic system defined in claim 4, said level responsive switch being a float actuated switch.

* * * * *